Nov. 16, 1926. 1,607,468
G. A. LAUGHTON ET AL
CUFF LINK
Filed Jan. 5, 1926

Patented Nov. 16, 1926.

1,607,468

UNITED STATES PATENT OFFICE.

GEORGE ABE LAUGHTON AND ERNEST BERTRAM PEET, OF BIRMINGHAM, ENGLAND; SAID PEET ASSIGNOR TO SAID LAUGHTON.

CUFF LINK.

Application filed January 5, 1926, Serial No. 79,404, and in Great Britain January 9, 1925.

This invention relates to expanding cuff links of the type wherein one or both of the heads or buttons contain a spring which is caused to act upon a member connecting one head or button with the other so as to draw the two together, and the object of the present invention is to provide a simplified and improved construction of cuff links of this type.

According to the present invention one or both of the heads or buttons are of hollow construction and contain a helical spring with which is associated the end of a flexible member, the flexiblity of which allows a relatively long helical spring to be housed within a hollow head of normal size, the spring when extended lying in a curve or coil within the head.

Any suitable form of connecting member may be used for the link and this connecting member is associated with the flexible member which is preferably in the form of a chain of small diameter which passes within the hollow head and through the centre of the spring therein, the end of the chain, beyond the end of the spring, being provided with a head. The arrangement is such that when tension is applied to the connecting member of the cuff link, the chain is pulled out or partially out of the hollow head but the coiled spring remains within the head and one end thereof finds an abutment against the inner side of the head adjacent to the hole through which the chain passes.

Referring to the drawings:—

Figure 1:
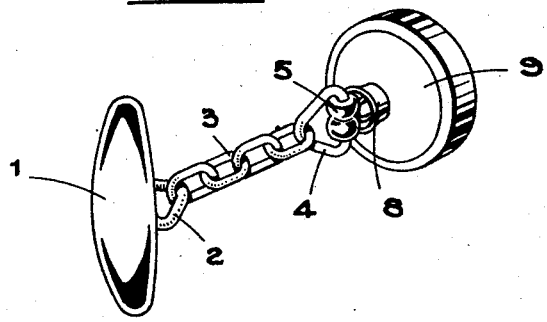
Figure 1 is a perspective view of the device.

In the construction illustrated, a head or button 1 which may be of a hollow or solid construction is provided with a link 2 attached to a chain or connecting member 3, which is in turn attached to a further link 4, which is coupled by means of an eye 5 to a small flexible chain 6. This small chain 6 passes through an aperture 7 formed by a tubular extension 8 in one end portion of a further head or button 9 of hollow construction. The chain 6, on passing through the aperture 7, is surrounded by a helical spring 10 and is provided at 11 with a stop to prevent its withdrawal through the spring. The other end of this spring 10 is made sufficiently large to prevent its withdrawal through the aperture 7.

The stop at 11 may be formed either by the chain and spring being soldered at this point, or by the end of the spring being passed through the last link in the chain and bent over. A cap 12 is provided on the head 9 forming an end portion to hold the spring in position.

The eye 5 is too large to pass through the aperture 7 so that it forms a stop to limit the expansion of the spring.

The action of the device is as follows:—

Figure 2:
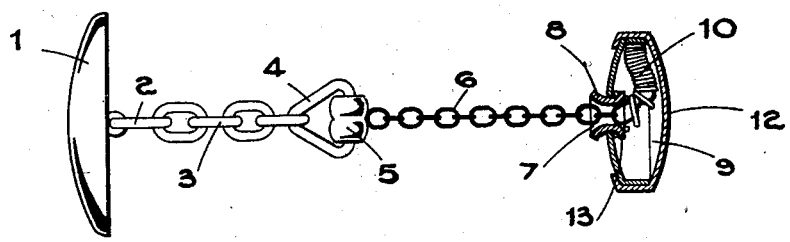
Figure 2 shows the device in part section.
Figure 3:
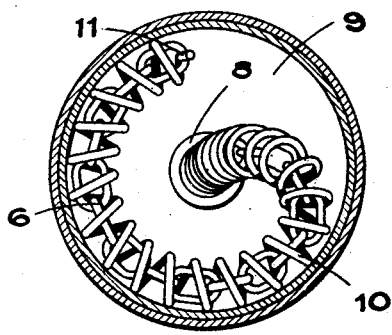
Figure 3 is a section of one of the heads or buttons containing the spring device in its extended position.
Figure 4:
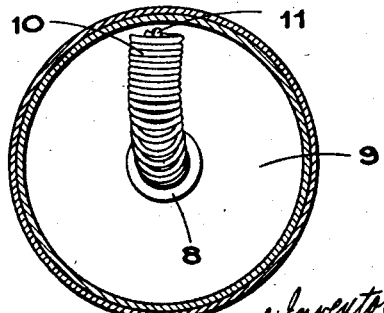
Figure 4 is similar to Figure 3, but shows the spring in its contracted position.

On the button or head 1 being drawn away from the head 9, the chain 6 is drawn through the aperture 7, and being attached at 11 to the spring 10 causes the said spring to contract as shewn in Figures 2 and 4.

The stop 11 may, if desired, be attached by a hook, or in any other known manner, to the casing 12 of the head or button 1.

The tube 8 is preferably provided with an enlarged opening at each end formed by expanding the tube. The object of these enlarged openings is to provide a smooth contact for the chain and also a means of attaching the spring 10 more securely in position. The spring 10 is adapted to surround the tube 8 and be held in place by the expanded portion or flare 13.

What we claim then is:—

1. A cuff link comprising two heads and a connecting member, one of said heads being of hollow disc like form and having an axial opening, a helical spring retained within the hollow head with its axis disposed at right angles to the axis of said head, said connecting member having a portion which is always exterior to said hollow head, and a flexible portion which passes through the opening and through the centre of the spring, the said flexible portion being connected to the end of said spring whereby the spring may be compressed between the said end of the flexible portion and interior of the hollow head.

2. A cuff link comprising two heads and a connecting member, one head being hollow and having two end portions and a peripheral portion, one of said end portions having an opening, a helical spring within said hollow head, said connecting member having a portion which is always exterior to said hollow head and a flexible portion which passes through said opening and through the centre of said spring, an eye connecting said exterior portion to said flexible portion, said eye forming a stop limiting the expansion of the spring, and means forming a stop at the end of said flexible portion to prevent it from being pulled through said spring.

3. A cuff link comprising two heads and a connecting member, one head being hollow and having two end portions and a peripheral portion, one of said end portions having an opening, a helical spring within said hollow head, the main portion of said spring, when relaxed, being disposed in a plane at right angles to said connecting member, said connecting member having a portion which is always exterior to said hollow head and a flexible portion which passes through said opening and through the centre of said spring, an eye connecting said exterior portion to said flexible portion, said eye forming a stop limiting the expansion of the spring, and means forming a stop at the end of said flexible portion to prevent it from being pulled through said spring.

4. A cuff link comprising two heads and a connecting member, one head being of hollow disc like form, one end of which has an opening, a helical spring within said hollow head, the main portion of said spring, when relaxed, being disposed in a plane at right angles to said connecting member, said connecting member having a portion which is always exterior to said hollow head and a flexible portion which passes through said opening and through the centre of said spring, and means forming a stop at the end of said flexible portion to prevent it from being pulled through said spring.

5. A cuff link comprising two heads and a connecting member, one head being of hollow disc like form, one end of which has an opening, a helical spring within said hollow head, said connecting member having a portion which is always exterior to said hollow head and a flexible portion which passes through said opening and through the centre of said spring, an eye connecting said exterior portion to said flexible portion, said eye forming a stop limiting the expansion of the spring, and means forming a stop at the end of said flexible portion to prevent it from being pulled through said spring.

6. A cuff link comprising two heads and a connecting member, one head being hollow and having two end portions and a peripheral portion, one of said end portions having an opening, a tube in said opening, a helical spring within said hollow head, and connecting member having a portion which is always exterior to said hollow head and a flexible portion which passes through said tube and through the centre of the spring, and means forming a stop at the end of said flexible portion to prevent it from being pulled through said spring.

7. A cuff link comprising two heads and a connecting member, one head being of hollow disc like form, one end of which has an opening, a tube in said opening, a helical spring within said hollow head, said connecting member having a portion which is always exterior to said hollow head and a flexible portion which passes through said tube and through the centre of the spring, and means forming a stop at the end of said flexible portion to prevent it from being pulled through said spring.

In witness whereof we affix our signatures.

GEORGE ABE LAUGHTON.
ERNEST BERTRAM PEET.